Sept. 30, 1952          C. C. FULS          2,612,137

SELF-FEEDER

Filed May 9, 1949

INVENTOR.
CHARLES C. FULS
BY
*Dybvig & Dybvig*
HIS ATTORNEYS

Patented Sept. 30, 1952

2,612,137

UNITED STATES PATENT OFFICE 2,612,137

SELF-FEEDER

Charles C. Fuls, near New Lebanon, Ohio

Application May 9, 1949, Serial No. 92,097

1 Claim. (Cl. 119—53)

This invention relates to a self feeder and more particularly to a self feeder for pets and the like, such as rabbits.

Numerous types of self feeders have been used for feeding rabbits and other small animals; but such self feeders are usually wasteful, in that the rabbits enjoy playing with the feed, shoving it aside with their noses and getting their paws into the feed, thereby digging the feed out of the feeder.

An object of this invention is to provide a self feeder wherein the feeding trough has an opening or openings sufficiently large for the rabbit to insert his nose, but too small to permit the rabbit to throw the feed out of the trough with his nose and sufficiently small to prevent the rabbit from getting his paw and his nose into the trough at the same time.

Furthermore, it is an object of this invention to provide a guard above the opening into the feeding compartment for retaining feed removed from the trough. This results in a self feeder that is economical, in that the feed is not wasted. This self feeder is dependable and at the same time provides adequate feeding facilities for rabbits and the like.

Other objects and advantages reside in the construction of parts, the combination thereof and the mode of operation, as will become more apparent from the following description.

In the drawings, Figure 1 is a perspective view of the preferred embodiment of the self feeder.

Figure 1:
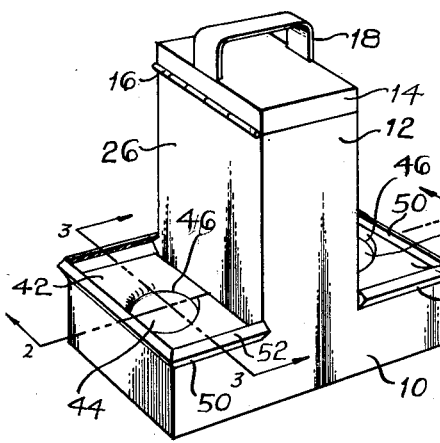

Referring to the drawings, the reference character 10 indicates the base of the self feeder. A hopper 12 is supported upon the base 10 and is provided with a lid or cover 14 hinged at 16 and manipulated by means of a handle 18. This provides a cover for an opening used in filling the self feeder. The upper side wall 20 of the hopper 12 is provided with a staple 22 seated in a suitable recess in the downwardly projecting hasp 24 mounted on the lid 14. Any other suitable device for holding the cover in position may be used.

Figure 2:
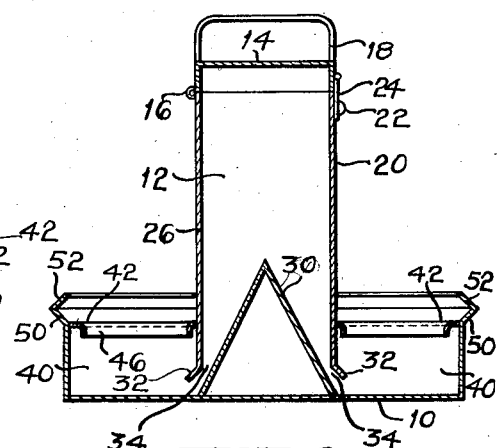
Figure 2 is a cross sectional view taken substantially on the line 2—2 of Figure 1.
Figure 3:
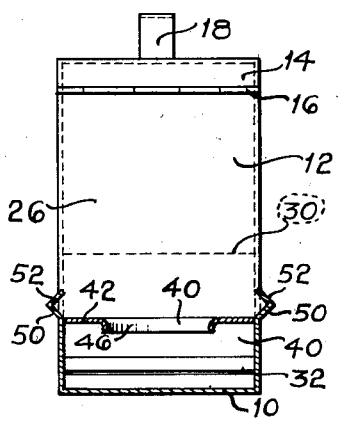
Figure 3 is another cross sectional view taken substantially on the line 3—3 of Figure 1.

The base 10 supports an inverted V-shaped deflector plate 30 for causing the feed to completely drain from the hopper 12. The lower margins 32 of the walls 20 and 26 of the hopper are deflected, so as to provide a pair of passages 34, one on either side of the inverted V-shaped deflector plate 30. The width of the passages 34 may be adjusted by bending the lower margins 32 of the walls 20 and 26, so as to regulate the flow of feed into the trough or feed compartment 40, one on either side, as shown in Figures 1, 2 and 3. The structure described thus far, with the exception of the adjustment of the passages 34, is substantially conventional as far as various types of self feeders are concerned.

A baffle-like plate member 42 is used for covering the trough or feed compartment 40. Member 42 is provided with one or more annular openings 44. Only one opening has been shown in the drawing. This opening 44 is surrounded by a downwardly directed flange 46 projecting downwardly into the feed compartment. This flange 46 provides a smooth edge surrounding the opening. Furthermore, it prevents the rabbit from readily throwing feed out of the trough; but permits the rabbit to insert his nose through this opening so as to feed. However, it has been found that the baffle-like plate member 42 provided with the opening or openings 44 and the downwardly projecting flange 46 does not completely prevent the rabbit from working feed out of the trough. Once in a while the rabbit will succeed in getting some feed up through the opening 44 and on top of the baffle-like plate member 42.

As a further precautionary measure for preventing the feed from being spilled, the baffle-like plate member 42 is surrounded by a molding-like retaining wall including the outwardly directed portion 50 and the inwardly directed portion 52, the portions 50 and 52 cooperating to form a substantially V-shaped wall surrounding three sides of the baffle-like plate member 42. By extending the ends of the hopper so as to project outwardly to the outer edge of the troughs, the retaining portions 50 and 52 extend along only one side of each trough. In the event the rabbit succeeds in getting pellets or feed upon the baffle-like member 42, the rabbit does not succeed in spilling the feed. The retaining portions 50 and 52 retain the feed upon the baffle-like plate member 42. It has been found that the rabbits waste practically no feed when fed from this self feeder. On very rare occasions are any of the pellets wasted.

When using the self feeder it may be necessary to adjust the passages 34 to provide the proper opening. For some types of feed, especially feed that is very glossy and finely ground, the passage is comparatively small. For other types of feed, especially pellets, shelled corn, oats and the like, it is necessary to use a much larger passage. If such is the case, it is merely necessary to deflect or bend the lower margins of the walls 20 and 26, to thereby provide the proper size of opening for the passage of the feed.

Figure 4:
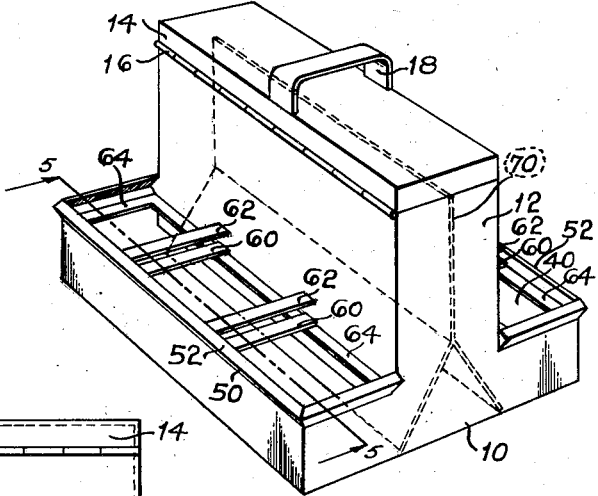
Figure 4 is a perspective view of a modification.
Figure 5:
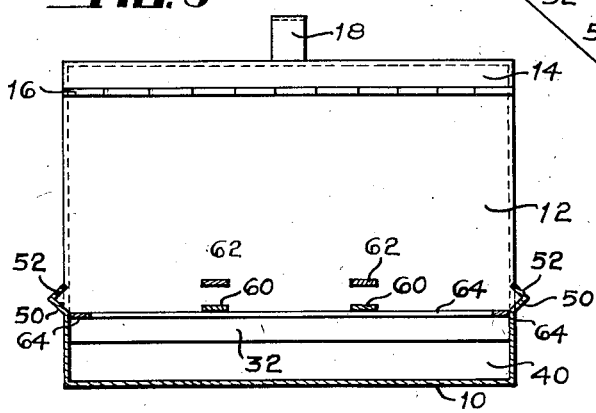
Figure 5 is a cross sectional view taken substantially on the line 5—5 of Figure 4.

Referring to the disclosures shown in Figures 4 and 5, another modification has been shown. In this modification the hopper 12 and the trough or feed compartment 40 are identical to that shown in the preferred embodiment, or substantially so. However, instead of the baffle-like plate members 42, shown in the preferred embodiment, metallic straps 60 and 62 extend across the trough at regular spaced intervals. Members 60 are attached by spot welding or otherwise to a frame member 64 extending along all sides of the trough portions 40 and are located below the molding-like retaining wall consisting of portions 50 and 52. Members 60 and 64 cooperate to form a baffle-like member. Members 62 are secured to portions 52 along the outer end and to the body of the hopper 12 at the inner end. These members 60 are spaced sufficiently close together so as to form openings that are substantially square, instead of the round openings 44 disclosed in the preferred embodiment. The straps 60 and 62 prevent the rabbit from throwing the feed out of the trough by jerking his head sidewise, in that the straps 60 and 62 limit the lateral movement of the head. Furthermore, these straps are sufficiently close together so as to make it practically impossible to insert the paw and the nose into the same opening, which seems to be required for the rabbit to lift feed out of the trough.

By providing openings sufficiently large to accommodate full grown rabbits, such a self feeder designed as described above is also very satisfactory for feeding young rabbits. The question may be asked, will a young rabbit insert his paws and nose at the same time? As far as the size is concerned, a young rabbit could probably do so; but a young rabbit, sitting on the floor adjacent the self feeder, is too small to reach over into the feed trough without supporting himself by his front feet on the flange portion 52. This flange portion 52 seems to be a natural as a step upon which the front paws of the young rabbits are positioned.

As best seen in Figure 4, two types of feed may be fed from the same hopper. This has been accomplished by providing a partition 70 extending from the top of the hopper to the inverted V-shaped deflector plate 30. This permits two types of feed to be fed, one type being fed through one trough and another type through the other trough, or it permits the use of the self feeder for supplying feed to two hutches. This may be accomplished by positioning the self feeder between two hutches. By partitioning the hopper, it can readily be seen that it is a comparatively easy matter to keep a record of the amount of feed supplied to each litter, one in each hutch.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A self feeder for rabbits including a trough-like portion forming a base, a centrally disposed inverted V-shaped deflecting member mounted in the bottom of the trough and extending throughout the length thereof, a rectangular sheet metal hopper mounted above the V-shaped deflecting member, the lower side edges of the hopper being mounted in close proximity to the legs of the inverted V, the lower edges of the hopper being bendable so as to adjust the width of the passage between the V-shaped member and the lower edges of the hopper by merely bending the lower edges of the hopper to thereby adjust the feed passage, baffle-like members mounted in the sides of the hopper in spaced relation from the bottom of the trough, said baffle-like members being provided with openings bounded by downwardly directed flange portions, said openings being sufficiently large to accommodate the nose of a rabbit but too small to accommodate the nose and a paw of a rabbit, the edges of the trough projecting above the baffle-like members, the portions of the edges of the trough located above the baffle-like members being deflected outwardly immediately above the baffle-like members so as to form a substantially 45° angle with respect to the baffle-like members, the upper portions being deflected inwardly so as to form a substantially 90° angle with respect to the outwardly deflected portions, the two deflected portions cooperating to form substantially V-shaped retaining grooves surrounding the baffle-like members to retain any feed tossed out of the trough.

CHARLES C. FULS.

REFERENCES CITED

The following references are of record in the file of this patent:

UNITED STATES PATENTS

| Number | Name | Date |
| --- | --- | --- |
| 988,962 | Baker | Apr. 11, 1911 |
| 1,159,190 | Derr | Nov. 2, 1915 |
| 1,518,891 | Angell | Dec. 9, 1924 |
| 1,593,705 | Nebergall | July 27, 1926 |
| 1,787,330 | Speicher | Dec. 30, 1930 |
| 2,457,432 | Ballard | Dec. 28, 1948 |